US012652629B2

(12) United States Patent
Chopra et al.

(10) Patent No.: US 12,652,629 B2
(45) Date of Patent: Jun. 9, 2026

(54) DRAN DISTRIBUTED UNIT DEPLOYMENT IN AN OPEN RAN ARCHITECTURE

(71) Applicant: Rakuten Symphony, Inc., Tokyo (JP)

(72) Inventors: Akashdeep Chopra, Tokyo (JP); Vishal Ghan, Tokyo (JP); Ashish Madan, Singapore (SG)

(73) Assignee: RAKUTEN SYMPHONY, INC., Tokyo (JP)

( * ) Notice: Subject to any disclaimer, the term of this patent is extended or adjusted under 35 U.S.C. 154(b) by 272 days.

(21) Appl. No.: 18/440,549

(22) Filed: Feb. 13, 2024

(65) Prior Publication Data

US 2025/0142494 A1 May 1, 2025

(30) Foreign Application Priority Data

Oct. 30, 2023 (IN) .............................. 202341073710

(51) Int. Cl.
*H04W 56/00* (2009.01)
*H04J 3/06* (2006.01)
(52) U.S. Cl.
CPC ......... *H04W 56/001* (2013.01); *H04J 3/0667* (2013.01)
(58) Field of Classification Search
CPC .............................. H04W 56/001; H04J 3/0667
See application file for complete search history.

(56) References Cited

U.S. PATENT DOCUMENTS

| | | | | |
|---|---|---|---|---|
| 2009/0238214 A1* | 9/2009 | Hong | .................... | H04J 3/0688 370/503 |
| 2021/0243797 A1* | 8/2021 | Reddy | ................. | H04L 27/2666 |
| 2023/0284178 A1* | 9/2023 | Parker | ....................... | G01S 5/01 455/456.1 |
| 2024/0098561 A1* | 3/2024 | Dural | ................ | H04W 72/0446 |
| 2024/0111594 A1* | 4/2024 | Ravindran | .............. | G06F 9/505 |
| 2024/0205312 A1* | 6/2024 | Boccuzzi | ................ | H04L 69/28 |
| 2025/0142494 A1* | 5/2025 | Chopra | ................ | H04J 3/0667 |

FOREIGN PATENT DOCUMENTS

| | | | | | |
|---|---|---|---|---|---|
| CN | 118828649 A | * | 10/2024 | ........... | H04W 56/00 |
| WO | WO-2022221260 A1 | * | 10/2022 | ........... | H04L 41/342 |
| WO | WO-2023133046 A1 | * | 7/2023 | ........... | H04B 7/0695 |
| WO | WO-2024030130 A1 | * | 2/2024 | ........... | H04W 24/04 |
| WO | WO-2025036846 A1 | * | 2/2025 | ........... | H04W 56/001 |

* cited by examiner

*Primary Examiner* — Shean Tokuta
(74) *Attorney, Agent, or Firm* — Sughrue Mion, PLLC

(57) ABSTRACT

Embodiments of the present disclosure disclose method and system for deploying Distributed Radio Access Network (DRAN) Distributed Units (DUs) 102c in an Open RAN architecture 100 is disclosed. The method comprises receiving, a deployment status of a DU cluster from a cloud server 103; triggering a timing manager service instantiation on the DU cluster based on the deployment status of the DU cluster; determining a timing synchronization status of the timing manager service; deploying one or more DU Network Functions (NFs) 102c on the DU cluster based on the timing synchronization status of the timing manager service; and deploying a configuration manager service on the DU cluster for configuring the one or more DU NFs 102c.

15 Claims, 5 Drawing Sheets

DRAN DISTRIBUTED UNIT DEPLOYMENT IN AN OPEN RAN ARCHITECTURE

CROSS REFERENCE TO RELATED APPLICATION(S)

This application claims priority based on India Non-Provisional Patent application No. 202341073710 filed Oct. 30, 2023.

TECHNICAL FIELD

The present disclosure generally relates to communication networks, and more particularly, to Distributed Radio Access Network (DRAN) Distributed Unit (DU) deployment in an Open RAN (O-RAN) architecture.

BACKGROUND

The advent of 5G technology has transformed the way users interact with digital devices and services to bring faster speeds, reduced latency, and service improvements. The fundamental architecture that makes this deployment possible is complex and multi-layered communication network. The multi-layer networks intensify coverage and absorb traffic, boosting network competitiveness, and driving 5G evolution.

5G equipment such as Radio Access Network (RAN) equipment have been mostly provided by proprietary vendors and Commercial Off The Shelf (COTS) devices were hardly used. However, the alliance of Open RAN (O-RAN) has provided equipment makers an opportunity to distribute the functionality of the RAN. Centralized RAN (CRAN) solution is where the network function elements are centrally located. A single Centralized Unit (CU) operates multiple Distributed Units (DUs). However, conventional DUs create a type of hard-limit in the benefit that can be gained from a C-RAN deployment due to the fixed capacity of each DU and the static boundary between each piece of hardware. For example, a conventional DU can experience severe load imbalance in some situations, as separate DUs assigned between rural and urban areas.

Another solution in the O-RAN architecture is a Distributed RAN (DRAN) where the DUs are capable of processing at cell site and each DU is provisioned for each Radio Unit (RU). While the DRAN approach further disaggregates the network functionality, the provisioning, and maintenance is a challenge. Automated deployments of DUs and configuration has remained a challenge.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, a method for deploying Distributed Radio Access Network (DRAN) Distributed Units (DUs) in an Open RAN architecture is disclosed. The method comprises receiving a deployment status of a DU cluster from a cloud server; triggering a timing manager service instantiation on the DU cluster based on the deployment status of the DU cluster; determining a timing synchronization status of the timing manager service; deploying one or more DU Network Functions (NFs) on the DU cluster based on the timing synchronization status of the timing manager service; and deploying a configuration manager service on the DU cluster for configuring the one or more DU NFs.

In another embodiment, a Service Management and Orchestrator (SMO) is disclosed. The SMO is configured to: receive a deployment status of a DU cluster from a cloud server; trigger a timing manager service instantiation on the DU cluster based on the deployment status of the DU cluster; determine a timing synchronization status of the timing manager service; deploy one or more DU Network Functions (NFs) on the DU cluster based on the timing synchronization status of the timing manager service; and deploy a configuration manager service on the DU cluster for configuring the one or more DU NFs.

In another embodiment, a computer readable storage media is disclosed. The storage media comprises instructions that when executed by a processor causes the processor to perform operations comprising: receiving a deployment status of a DU cluster from a cloud server; triggering a timing manager service instantiation on the DU cluster based on the deployment status of the DU cluster; determining a timing synchronization status of the timing manager service; deploying one or more DU Network Functions (NFs) on the DU cluster based on the timing synchronization status of the timing manager service; and deploying a configuration manager service on the DU cluster for configuring the one or more DU NFs.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. The same numbers are used throughout the figures to reference like features and components. Some embodiments of device and/or methods in accordance with embodiments of the present subject matter are now described, by way of example only, and with reference to the accompanying figures, in which.

Figure 1:
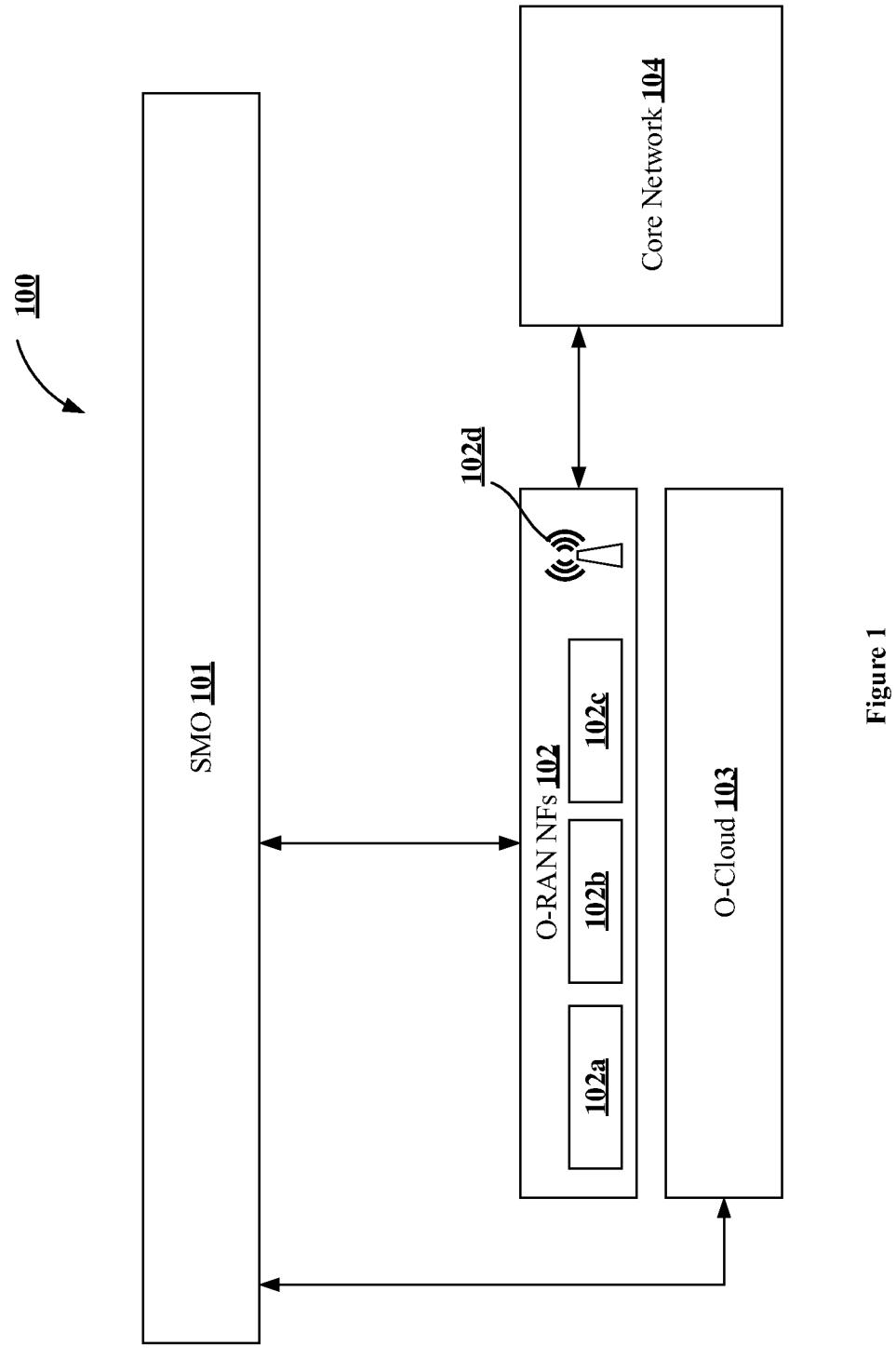
FIG. 1 is an example representation of cloud orchestration in a cloud-native deployment related to at least some example embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and may be executed by an apparatus, an example of such apparatus may be a computer or processor.

DETAILED DESCRIPTION

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

It shall be noted that, for convenience of explanation, the disclosure uses terms and names defined in the 3rd Generation Partnership Project Radio Access Network (3GPP RAN) standards and in the absence of any specific interpretation or explanation provided herein such terms are to be interpreted as specified by the 3GPP RAN standards.

The term 'cloud orchestration' as used herein refers to the process of coordinating tools, applications, Application Programming Interfaces (APIs), and infrastructure across private and public clouds into comprehensive workflows. More specifically, cloud orchestration is an automated process to deploy, configure, integrate & manage containers (i.e., VNF (s)/CNF(s)) and microservices of a 5G system. It shall be noted that the cloud orchestration is not only performed on containers and applications/microservices but also on IT systems, and network elements. As such, cloud orchestrator comprises of set of distributed cloud native micro services, which can be stateful or stateless. In this disclosure, cloud orchestration is done in a cloud-native deployment and are geo-redundancy aware which is explained in detail with reference to FIGS. 1-5.

FIG. 1 is an example representation of cloud orchestration in a cloud-native deployment of a Distributed Radio Access Network (DRAN) architecture 100 related to at least some example embodiments of the present disclosure. The DRAN architecture 100 comprises a Service and Management Orchestrator (SMO) 101, Open RAN (O-RAN) Network Functions (NFs) 102 and a core network 104. In some embodiments, the core network 104 may not be part of the DRAN, but is associated with the elements of DRAN. The DRAN architecture further comprises an open cloud 103.

The O-RAN architecture introduces a RAN Intelligent Controller (RIC) (not shown in FIG. 1). In the O-RAN architecture, there are two logical forms of the RIC, and each performs a different function. A near-real-time RIC is a distributed RIC that runs extensible microservices from third-party vendors, to manage and optimize resources for the NFs. The non-real-time RIC is a centralized RIC is configured to collect data, build machine learning models, and send optimization policies to the near-RT RIC for execution. Both the near-real-time RIC (near-RT RIC) and the non-real-time RIC (non-RT RIC) may be virtualized or containerized logical components that play a role in controlling and optimizing RAN elements and resources. The non-real time (Non-RT) control functions of greater than 1 second typically reside in the non-RT RIC and the near-real time (near-RT) control functions of between 10 milliseconds and 1 second reside in the near-RT RIC. The non-RT functions may be located in the SMO 101 performing functions such as deploying and configuring the NFs. Other non-RT functions may include but, not limited to policy management, RAN analytics, and training for machine-learning models.

In an embodiment, the O-RAN NFs 102 may include, O-CU-UP 102a, O-CU-CP 102b, O-DU 102c, and O-RU 102d. The O-CU-UP 102a and the O-CU-CP 102b controls the radio protocol stacks, the O-DU 102c manage the physical layer functionalities and the O-RU 102d provides RF processing. The O-DU 102c is also referred as DU 102c in the present disclosure. There may be one DU or many DUs. Collectively, the DUs may be referred as one or more DUs 102c. In an embodiment, the O-RAN NFs 102 are virtualized and are hosted on open cloud hardware, for instance on Commercial Off the Shelf (COTS) servers.

In an embodiment, the O-cloud 103 is a cloud computing platform composed of physical infrastructure nodes meeting O-RAN requirements to host O-RAN NFs. In an embodiment, the O-cloud 103 may be implemented using a Bare Metal Manager (BMM) to host a plurality of NFs. In another embodiment, the O-cloud 103 may be implemented using virtual machines. Furthermore, the O-cloud 103 combines physical nodes, software components (e.g., the operating system, virtual machine hypervisors, etc.), and management and orchestration functionalities. In an instance, the O-cloud 103 may be a regional cloud, an edge cloud or a cell site. For example, the regional cloud may be a data center while an edge cloud may have limited resource and capabilities. In an embodiment, deploying the O-RAN NFs 102 may be based on Service Level Agreements (SLAs).

In an embodiment, the SMO 101 may be configured to oversee the orchestration, automation, and control of RAN functions and infrastructure. More specifically, the SMO 101 may comprise specific units such as Life Cycle Manager (LCM) that manages lifecycle of NFs.

In an embodiment, the core network 104 may perform functions such as policy management, session management, access and mobility management, network slice management, and the like.

Figure 2:
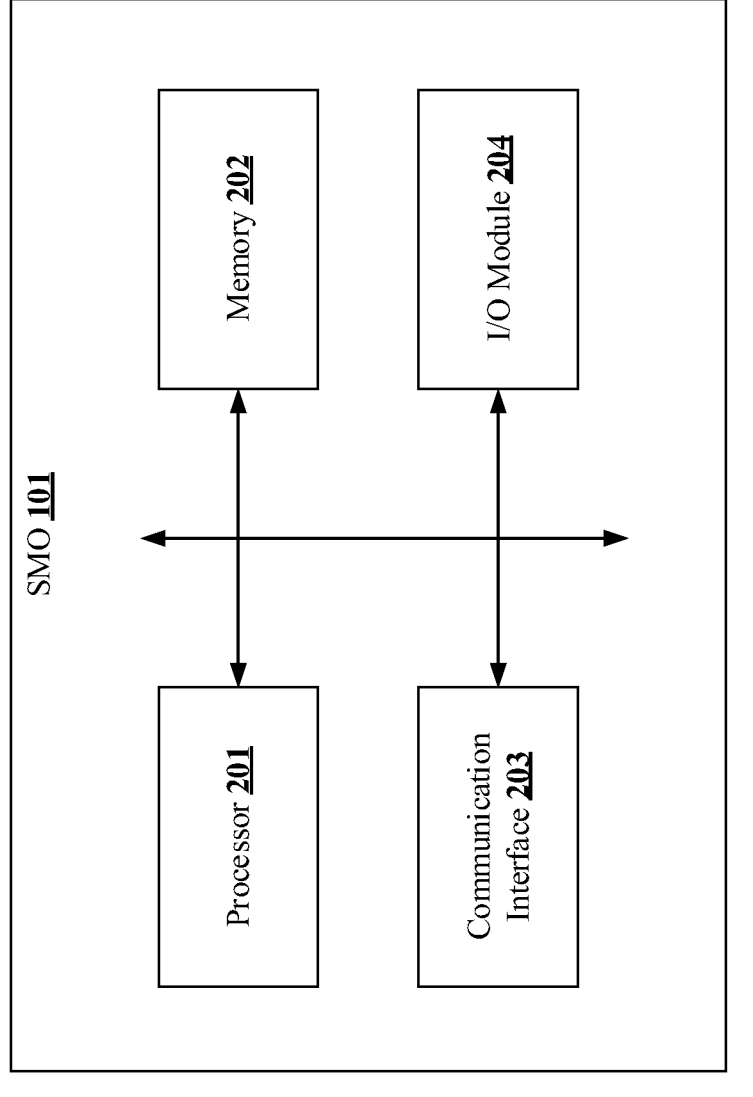
FIG. 2 shows a simplified illustration of internal architecture of a SMO, in accordance with an embodiment of the present disclosure.

FIG. 2 illustrates a simplified representation of internal architecture of the SMO 101. In some embodiments, the illustration of FIG. 2 shows elements that are required to implement the proposed solution. However, a person skilled in the art will appreciate that the SMO 101 may include more or less elements and the scope of SMO 101 may not be limited to the illustration made in FIG. 2. In an embodiment, the SMO 101 uses Zero Touch Provisioning (ZTP) workflow to facilitate instantiation of the one or more DUs 102c. ZTP allows provisioning new edge nodes to configure BMM equipment at remote locations.

The SMO 101 comprises one or more processors collectively referred as processor 201 in FIG. 2, a memory 202, a communication interface 203, and an Input/Output (I/O) module 204.

In an embodiment, the processor 201 may be part of a server/servers and host a database. Some examples of the database include, but not limited to, a registry, a relational database, a NoSQL database, Graph database, time-series based database, minio, chartmuseum, Persistent Volume (PV), application database, and the like. Registry is configured to store a plurality of docker images in layered fashion. The NoSQL data, graph data, time-series based data, LCM data, and monitoring data of CNFs/VNFs may be stored in relational and time-series based stores. Minio is an object storage to store very large files like CNF package, VNF package, etc. The CNFs/VNFs package usually contain helm packages, docker images and metadata. During CNF package on boarding, helm charts are stored in chartmuseum.

In one embodiment, the processor 201 may be embodied as a multi-core processor, a single core processor, or a combination of one or more multi-core processors and one or more single core processors. For example, the processor 201 may be embodied as one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like.

In one embodiment, the memory 202 is capable of storing machine executable instructions, referred to herein as instructions. In an embodiment, the processor 201 is embodied as an executor of software instructions. As such, the processor 201 is capable of executing the instructions stored in the memory 202 to perform one or more operations described herein. Further, the memory 202 is capable of storing a status information of DU cluster, timing synchronization status, one or more synchronization parameters and NF deployment status.

The memory 202 can be any type of storage accessible to the processor 201 to perform respective functionalities, as will be explained in detail with reference to FIGS. 2 to 5. For example, the memory 202 may include one or more volatile or non-volatile memories, or a combination thereof. For example, the memory 202 may be embodied as semiconductor memories, such as flash memory, mask ROM, PROM (programmable ROM), EPROM (erasable PROM), RAM (random access memory), etc. and the like.

In an embodiment, the I/O module 204 may include mechanisms configured to receive inputs from and provide outputs to the cloud server 103, the O-RAN NFs 102. In an embodiment, the one or more synchronization parameters may be provided by the cloud server 103 which may be periodically update the synchronization parameters based on cloud parameters.

To enable reception of inputs and provide outputs to SMO 101, the I/O module 204 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like. It shall be noted that some network nodes in a wireless communication system may not include all the components listed above in the input interface/output interface and hence it should be apparent to a person skilled in the art that embodiments of the present disclosure may be practiced without the input interface/output interface.

The communication interface 203 may include mechanisms configured to communicate with other entities such as the cloud server 103 and the O-RAN NFs 102. In an embodiment, the communication interface 203 may support various interfaces including, but not limited to R1 interface, A1 interface, O1 interface, O2 interface, M-plane.

In an embodiment, the R1 interface operates to cater RT-RIC. It is designed to support portability of multi-vendor rApps. The interface enables Open APIs to be integrated in the SMO 101. It is a collection of services including service registration and discovery services, authentication and authorization services, AI/ML workflow services, and A1, O1 and O2 related services.

In an embodiment, the A1 interface is used for policy guidance. The SMO 101 provides policy guidance such as changing frequency of a User Equipment (UE).

In an embodiment, the SMO 101 supports O1 interface for managing the operation and maintenance (OAM) of multi-vendor O-RAN functions including fault, configuration, accounting, performance and security management, software management, and file management capabilities.

In an embodiment, the O2 interface enables cloud infrastructure management and deployment operations with the O-cloud 103 that hosts the O-RAN functions. The O2 interface supports orchestration of the O-Cloud infrastructure resource management (e.g., inventory, monitoring, provisioning, software management and lifecycle management) and deployment of the O-RAN NFs 102, providing logical services for managing the lifecycle of deployments that use cloud resources.

In an embodiment, the M-Plane may be an alternative to the O1 interface for supporting multi-vendor O-RU integrations. Open Fronthaul M-plane supports the management features including startup installation, software management, configuration management, performance management, fault management and file management.

The processor 201 may use the O2 interface to deploy the DU cluster. In an embodiment, the processor 201 is configured to execute the instructions for: (1) receiving a deployment status of a DU cluster from a cloud server, (2) triggering a timing manager service instantiation on the DU cluster based on the deployment status of the DU cluster, (3) deploying one or more DU Network Functions (NFs) on the DU cluster based on the timing synchronization status of the timing manager service, (4) deploying one or more DU Network Functions (NFs) on the DU cluster based on the timing synchronization status of the timing manager service, (5) deploying a configuration manager service on the DU cluster for configuring the one or more DU NFs.

In an embodiment, the deployment status is indicative of a readiness of the DU cluster for deploying the one or more DU NFs. In an embodiment, the processor 201 is configured to distribute timing information to one or more network elements of the DRAN. The one or more network elements may include at least a DU server/DU cluster (includes a plurality of DU servers), a Cell Hub Router (CHR) and a O-RU 102d. The DU cluster (also commonly known as target cluster) is identified optimally to suit requirements of a vendor. The DU cluster may be a typical server or a BMM as described before.

The processor 201 is further configured to determine timing synchronization between the DU cluster and the one or more network elements. In some embodiments, the processor 201 may determine timing synchronization between the DU clusters (i.e., between the DU servers) and/or timing synchronization between the DU clusters and the one or more network elements. The timing synchronization is determined using the timing manager service deployed on the DU cluster and/or the one or more network nodes. Furthermore, the processor 201 determines the status of the DU cluster as one of SYNCED and NOT SYNCED based on the timing synchronization. In an embodiment, the processor 201 implements Precision Time Protocol (PTP) for synchronizing the DU clusters and/or the one or more network elements. In an embodiment, the processor 201 is further configured to configure network parameters for the one or more DU NFs (O-DU) 102c.

Figure 3:
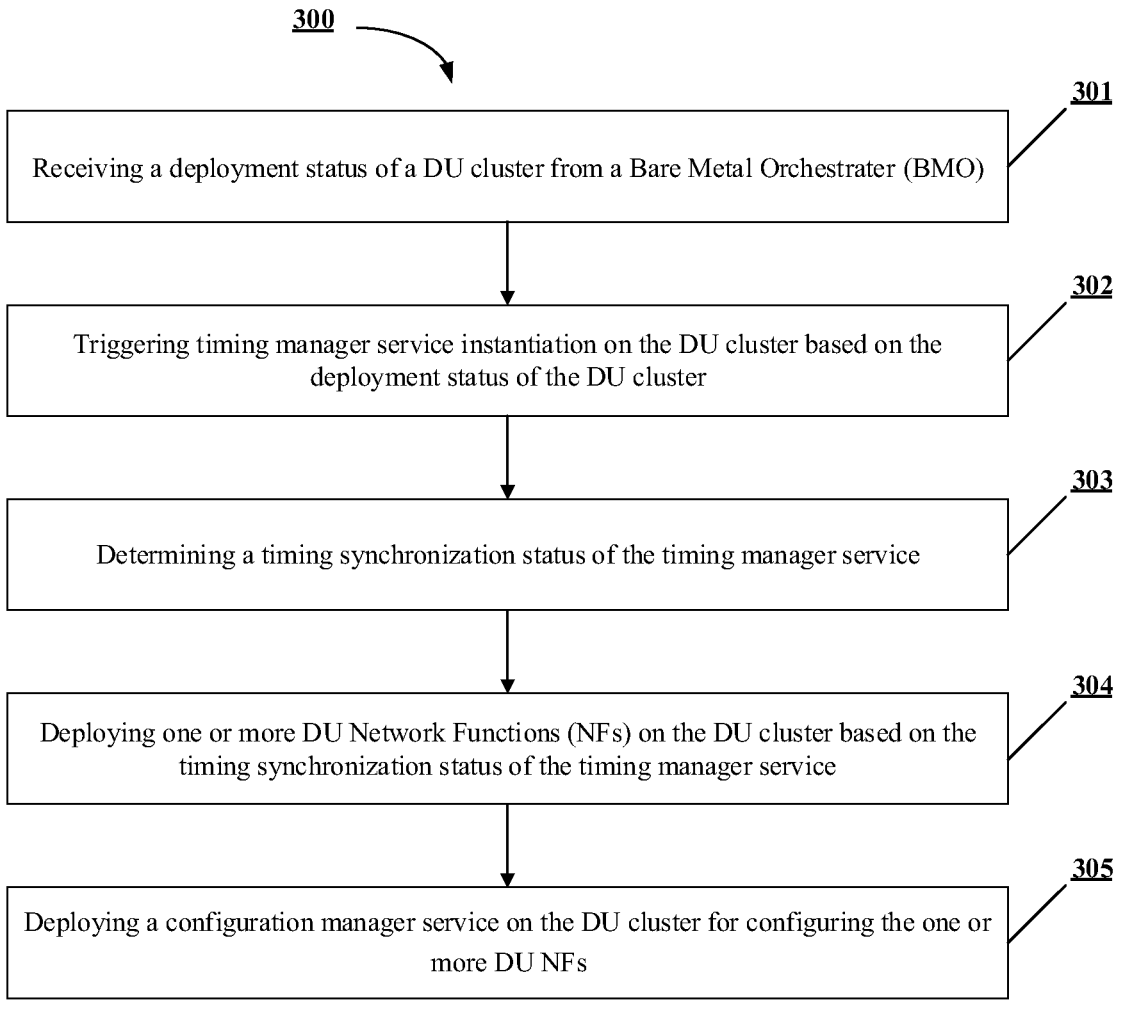
FIG. 3 illustrates a method flowchart for deploying DRAN DUs, in accordance with an embodiment of the present disclosure.

FIG. 3 is a flowchart illustrating a method 300 for deploying DU NFs 102c. The method 300 depicted in the flow diagram may be executed by the processor 201. Operations of the flow diagram, and combinations of operation in the flow diagram, may be implemented by, for example, hardware, firmware, a processor, circuitry and/or a different device associated with the execution of software that includes one or more computer program instructions. The operations of the method 300 are described herein with help of the processor 202 embodied within the SMO 101. It is noted that the operations of the method 300 can be described and/or practiced by using one or more processors 101. The method steps of FIG. 3 is described by making reference to the sequence diagram of FIG. 4. In an embodiment, a Zero Touch Provisioning (ZTP) workflow can be followed to instantiate the DUs. The ZTP workflow is explained as under.

Figure 4:
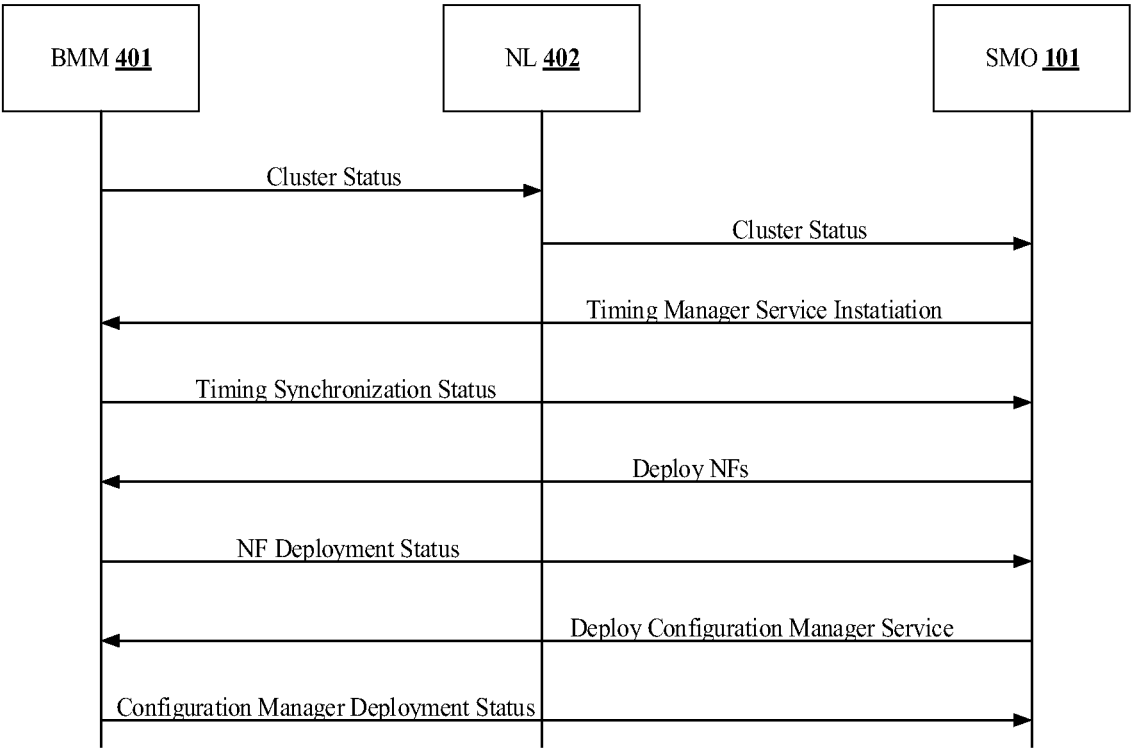
FIG. 4 illustrates a sequence flow diagram for deploying DRAN DUs, in accordance with an embodiment of the present disclosure.

At operation 301 of the method 300, receiving a deployment status of the DU cluster from a cloud server. In some embodiments the DU cluster may be identified using optimizing techniques based on various parameters such as vendor SLAs. The DU cluster may be a DU server/group of servers deployed in the O-cloud 103. As seen in FIG. 4, the DU cluster which may be implemented on the bare-metal host may be monitored by a BMM 401 and can share a deployment status of the DU cluster. In an embodiment, the deployment status is indicative of a readiness of the DU cluster for deploying the one or more DU NFs. In an embodiment, the readiness of the DU cluster may include details of network connectivity. For example, DNS status of a bare-metal host may be determined. Further provisioning is performed to deploy the DU NFs 102c. For instance, operating system is installed on the bare-metal hosts either on a virtual machine or containers and downloading image files of the operating system. In an embodiment, the BMM 401 may also share cluster name, domain and other details along with the deployment status.

At operation 302 of the method 300, triggering the timing manager service instantiation on the DU cluster based on the deployment status of the DU. A communication between the SMO 101 and the BMM 401 for deploying the timing manager service is shown in FIG. 4. In an embodiment, the timing manager service may be deployed as a daemon set on the DU cluster. In some embodiments, the timing manager service may also be deployed on other O-RAN NFs 102 such as the O-RU 102d. The timing manager service is instantiated by specifying the parameters for the timing synchronization, such as synchronization period, synchronization protocol and other related parameters generally required for timing synchronization. In some embodiments, the synchronization protocol may be PTP. Once instantiated, the timing manager service synchronizes the clocks in the DU cluster and/or the other RAN NFs 102. The clocks synchronized by PTP may be organized in a master-worker hierarchy. The workers are synchronized to their masters, which may be workers to their own masters. The hierarchy is created and updated automatically by the Best Master Clock (BMC) algorithm, which runs on every clock. When a clock has only one port, it can be master or worker, such a clock is called an ordinary clock. A clock with multiple ports can be master on one port and worker on another, such a clock is called a boundary clock. The top-level master is called the grandmaster clock, which can be synchronized by using a Global Positioning System (GPS) time source. By using a GPS-based time source, disparate networks can be synchronized with a high-degree of accuracy. The timing manager service ensures compliance with the O-RAN Alliance specifications for time synchronization and network coordination, helping to ensure interoperability and compatibility between different vendors and equipment in the network. Further, the timing manager service follows the PTP for accurate and reliable time synchronization.

At step 303 of the method 300, determining a timing synchronization status of the timing manager service. Determining the timing synchronization comprises distributing timing information to the one or more network elements of the DRAN; determining timing synchronization between the DU cluster and the one or more network elements; and determining the status of the DU cluster as one of SYNCED and NOT SYNCED based on the timing synchronization. In an embodiment, timing information may be synchronization error, time calibration values, location of the DUs and the like. When the clocks in each DU and/or other network elements are synchronized (for example synchronized to certain milliseconds/microseconds), the DU cluster is considered to be SYNCED, otherwise the DU cluster is UNSYNCED.

At step 304 of the method 300, deploying the one or more DU NFs 102c on the DU cluster based on the timing synchronization status. The one or more DU NFs 102c are deployed as VNF on the O-cloud 103 bare metal hosts. The DU NFs may be deployed on a regional cloud or an edge cloud or both.

At step 305 of the method 300, deploying a configuration manager service on the DU cluster for configuring the one or more DU NFs 102c. In an embodiment, the configuration manager service may configure the distribution unit to communicate with other DUs, configure the functions of the DUs, and the like. For example, a Quality of Service (QOS) workflow may be configured, a policy control can be configured, a network slice information can be configured and the like. Such networking functions and parameters associated can be automatically configured using the ZTP workflow.

The present disclosure enables complete deployment, management and orchestration of DUs in the ORAN architecture 100 in an automated manner.

The sequence of operations of the methods 300 need not be necessarily executed in the same order as they are presented. Further, one or more operations may be grouped together and performed in form of a single step, or one operation may have several sub-steps that may be performed in parallel or in sequential manner.

The disclosed method with reference to FIG. 3 or one or more operations of the method 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer.

In an embodiment, a computer readable storage media in which a software (program) is recorded is read in an information processing apparatus such as the SMO (101), which includes the processor 201 and the memory 202, and the processor 201 executes a process of the software.

In a first embodiment, a method and system for deploying Distributed Radio Access Network (DRAN) Distributed Units (DUs) in an Open RAN architecture. The method comprises receiving a deployment status of a DU cluster from a cloud server; triggering a timing manager service instantiation on the DU cluster based on the deployment status of the DU cluster; determining a timing synchronization status of the timing manager service; deploying one or more DU Network Functions (NFs) on the DU cluster based on the timing synchronization status of the timing manager service; and deploying a configuration manager service on the DU cluster for configuring the one or more DU NFs.

In a second embodiment, in combination with any other embodiments, wherein the deployment status is indicative of a readiness of the DU cluster for deploying the one or more DU NFs.

In a third embodiment, in combination with any other embodiments, wherein determining the timing synchronization status of the timing manager service comprises: distributing timing information to one or more network elements of the DRAN;

determining timing synchronization between the DU cluster and the one or more network elements; and determining the status of the DU cluster as one of SYNCED and NOT SYNCED based on the timing synchronization.

In a fourth embodiment, in combination with any other embodiments, wherein triggering the timing manager service instantiation further comprises: causing the timing manager service to follow Precision Time Protocol (PTP).

In a fifth embodiment, in combination with any other embodiments, wherein deploying the configuration manager service comprises: causing the configuration manager service to configure network parameters for the one or more DU NFs.

Figure 5:
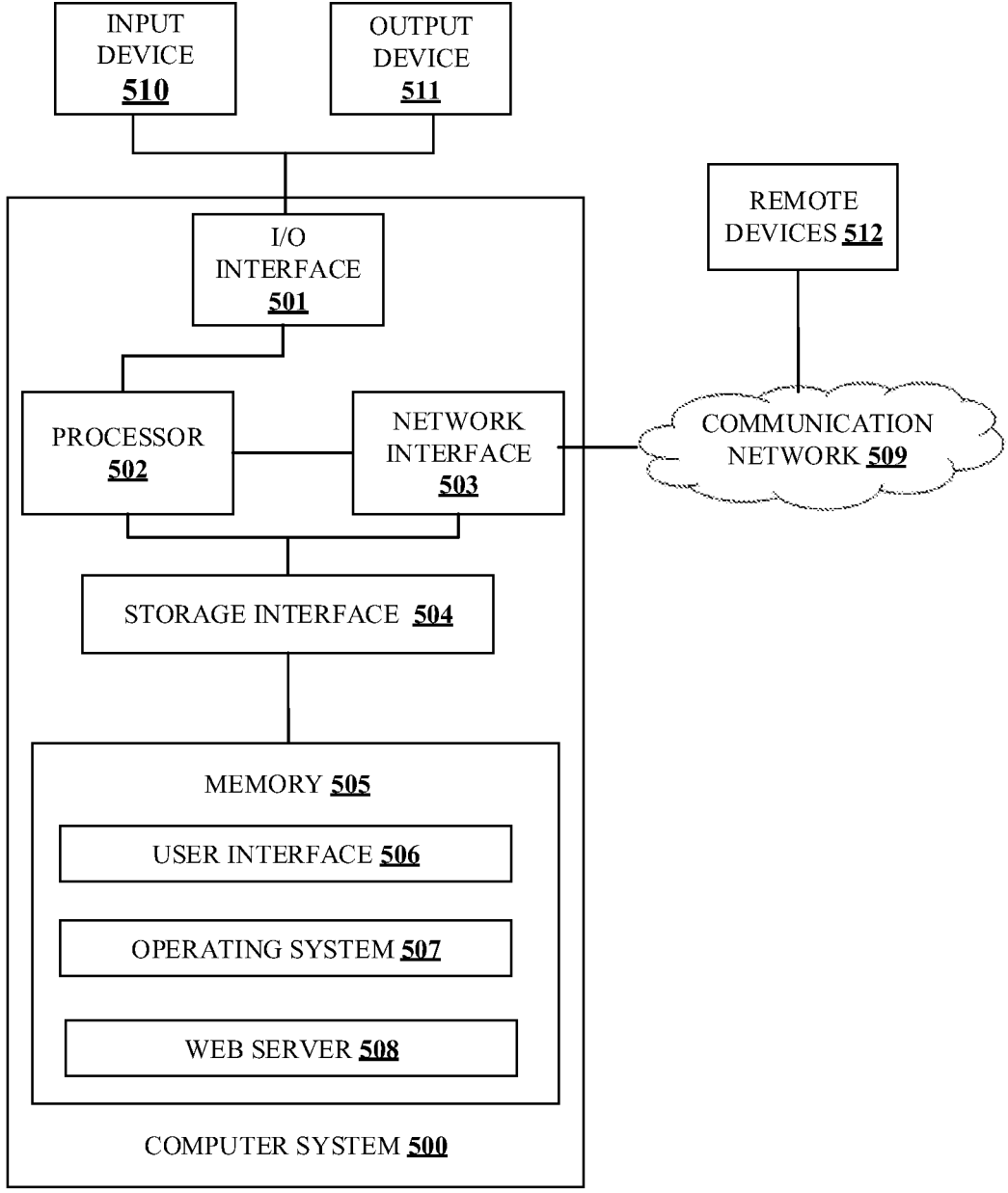
FIG. 5 shows a block diagram of a general-purpose computer for deploying DRAN DUs, in accordance with an embodiment of the present disclosure.

FIG. 5 shows a block diagram of a general-purpose computer for deploying DUs in ORAN architecture, in accordance with an embodiment of the present disclosure. The computer system 500 may comprise a central processing unit ("CPU" or "processor") 502. The processor 502 may comprise at least one data processor. The processor 502 may include specialized processing units such as integrated system (bus) controllers, memory management control units, floating point units, graphics processing units, digital signal processing units, etc. The computer system 500 may be analogous to the geo-redundant operator 200 (shown in FIG. 2).

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 is connected to the remote devices 512 through a communication network 509. The remote devices 512 may be the second data system 130 or in some embodiments, the other servers of the first data system 110 implemented in a different cloud. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with the remote devices 512. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, 3GPP and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web server 508, etc. In some embodiments, computer system 500 may store user/application data, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBER FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™ ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™ MICROSOFT® OUTLOOK™, MOZILLA® THUNDERBIRD™, etc.

Furthermore, one or more computer-readable storage media may be utilized in implementing embodiments consistent with the present disclosure. A computer-readable storage media refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD (Compact Disc) ROMs, DVDs, flash drives, disks, and any other known physical storage media.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to inventions containing only one such recitation, even when the introductory phrases "one or more" or "at least one" and indefinite articles such as "a" or "an" (e.g., "a" and/or "an" should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following detailed description.

We claim:

1. A method for deploying Distributed Radio Access Network (DRAN) Distributed Units (DUs) in an Open RAN architecture, comprising:

receiving a deployment status of a DU cluster from a cloud server;

triggering a timing manager service instantiation on the DU cluster based on the deployment status of the DU cluster;

determining a timing synchronization status of the timing manager service;

deploying one or more DU Network Functions (NFs) on the DU cluster based on the timing synchronization status of the timing manager service; and deploying a configuration manager service on the DU cluster for configuring the one or more DU NFs.

2. The method as claimed in claim 1, wherein the deployment status is indicative of a readiness of the DU cluster for deploying the one or more DU NFs.

3. The method as claimed in claim 1, wherein determining the timing synchronization status of the timing manager service comprises:

distributing timing information to one or more network elements of the DRAN;

determining timing synchronization between the DU cluster and the one or more network elements; and determining the status of the DU cluster as one of SYNCED and NOT SYNCED based on the timing synchronization.

4. The method as claimed in claim 1, wherein triggering the timing manager service instantiation further comprises:

causing the timing manager service to follow Precision Time Protocol (PTP).

5. The method as claimed in claim 1, wherein deploying the configuration manager service comprises:

causing the configuration manager service to configure network parameters for the one or more DU NFs.

6. A Service Management and Orchestrator (SMO) configured to:

receive a deployment status of a DU cluster from a cloud server;

trigger a timing manager service instantiation on the DU cluster based on the deployment status of the DU cluster;

determine a timing synchronization status of the timing manager service;

deploy one or more DU Network Functions (NFs) on the DU cluster based on the timing synchronization status of the timing manager service; and deploy a configuration manager service on the DU cluster for configuring the one or more DU NFs.

7. The SMO as claimed in claim 6, wherein the SMO receives the deployment status of the DU cluster indicating a readiness of the DU cluster for deploying the one or more DU NFs.

8. The SMO as claimed in claim 6, wherein the SMO is configured to determine the timing synchronization status of the timing manager service, wherein the SMO is further configured to:

distribute timing information to one or more network elements of the DRAN;

determine timing synchronization between the DU cluster and the one or more network elements; and determine the status of the DU cluster as one of SYNCED and NOT SYNCED based on the timing synchronization.

9. The SMO as claimed in claim 6, wherein the SMO is configured to trigger the timing manager service instantiation wherein the SMO is further configured to:

cause the timing manager service to follow Precision Time Protocol (PTP).

10. The SMO as claimed in claim 6, wherein the SMO is configured to deploy the configuration manager service, wherein the SMO is further configured to:

cause the configuration manager service to configure network parameters for the one or more DU NFs.

11. A computer readable storage media comprising executable instructions, which when executed by a processor, cause the processor to effectuate operations comprising:

receiving a deployment status of a DU cluster from a cloud server;

triggering a timing manager service instantiation on the DU cluster based on the deployment status of the DU cluster;

determining a timing synchronization status of the timing manager service;

deploying one or more DU Network Functions (NFs) on the DU cluster based on the timing synchronization status of the timing manager service; and deploying a configuration manager service on the DU cluster for configuring the one or more DU NFs.

12. The computer readable storage media as claimed in claim 11, wherein the deployment status is indicative of a readiness of the DU cluster for deploying the one or more DU NFs.

13. The computer readable storage media as claimed in claim 11, wherein the instructions cause the processor to effectuate operations comprising determining the timing synchronization status of the timing manager service, wherein the operations further comprising:

distributing timing information to one or more network elements of the DRAN;

determining timing synchronization between the DU cluster and the one or more network elements; and determining the status of the DU cluster as one of SYNCED and NOT SYNCED based on the timing synchronization.

14. The computer readable storage media as claimed in claim 11, wherein the instructions cause the processor to effectuate operations comprising triggering the timing manager service instantiation wherein the operations further comprising:

causing the timing manager service to follow Precision Time Protocol (PTP).

15. The computer readable storage media as claimed in claim 11, wherein instructions cause the processor to effectuate operations comprising deploying the configuration manager service, wherein operations further comprising:

causing the configuration manager service to configure network parameters for the one or more DU NFs.

* * * * *